(12) United States Patent
Roth

(10) Patent No.: US 8,746,465 B2
(45) Date of Patent: Jun. 10, 2014

(54) ELECTRICAL SWITCHGEAR AND DISTRIBUTION CABINET

(75) Inventor: Michael Roth, Sasbach (DE)

(73) Assignee: ABB AG, Mannheim (DE)

( * ) Notice: Subject to any disclaimer, the term of this patent is extended or adjusted under 35 U.S.C. 154(b) by 149 days.

(21) Appl. No.: 13/293,869

(22) Filed: Nov. 10, 2011

(65) Prior Publication Data

US 2012/0112610 A1    May 10, 2012

(30) Foreign Application Priority Data

Nov. 10, 2010 (EP) ..................... 10014456

(51) Int. Cl.
*A47F 7/00* (2006.01)

(52) U.S. Cl.
USPC ......................... 211/26; 312/265.1

(58) Field of Classification Search
USPC ......... 211/26, 191, 192, 175, 189; 312/265.1, 312/265.2, 265.3, 265.4, 265.5, 257.1; 361/724, 725, 726, 829
See application file for complete search history.

(56) References Cited

U.S. PATENT DOCUMENTS

| | | | |
|---|---|---|---|
| 6,478,166 B2 * | 11/2002 | Hung | 211/26 |
| 6,520,345 B1 * | 2/2003 | Marovic et al. | 211/26 |
| 6,655,533 B2 * | 12/2003 | Guebre-Tsadik | 211/26 |
| 6,739,463 B2 * | 5/2004 | Wishart et al. | 211/189 |
| 6,769,551 B2 * | 8/2004 | Rafferty et al. | 211/26 |
| 7,277,273 B2 * | 10/2007 | Smith et al. | 211/26 |
| 7,293,666 B2 * | 11/2007 | Mattlin et al. | 211/189 |
| 7,485,803 B2 * | 2/2009 | Adducci et al. | 312/265.1 |
| 8,395,046 B2 * | 3/2013 | Nicewicz et al. | 312/265.1 |
| 8,459,756 B2 * | 6/2013 | Linhares et al. | 312/265.3 |
| 8,490,799 B2 * | 7/2013 | Knight et al. | 211/26 |

FOREIGN PATENT DOCUMENTS

DE    8432766 U1    5/1985

* cited by examiner

*Primary Examiner* — Jose V Chen
(74) *Attorney, Agent, or Firm* — Buchanan Ingersoll & Rooney PC

(57) ABSTRACT

Exemplary embodiments are directed to an electrical switchgear and/or distribution cabinet having meter and distribution panels, in which supporting profiles attach electrical and/or electronic components, such as electricity meters and automatic circuit breakers. The supporting profiles are in the form of C profiles or U profiles. A sliding rail is connected to at least one holding apparatus for holding a supporting profile. The supporting profiles have different shapes, profiles and dimensions, with the sliding rail being connected in a fixed position, at predetermined positions, to the relevant wall of the switchgear and/or distribution cabinet, and the respective holding apparatus being able to be fixed in position on the sliding rail.

18 Claims, 3 Drawing Sheets

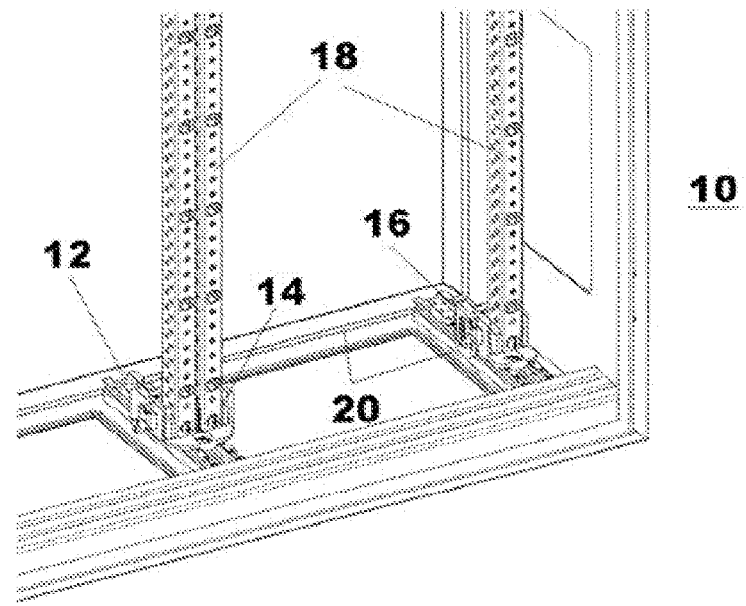
Fig. 1
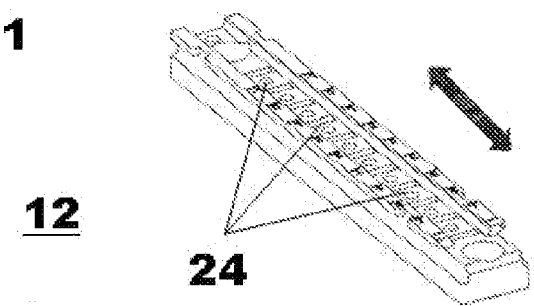
Fig. 2
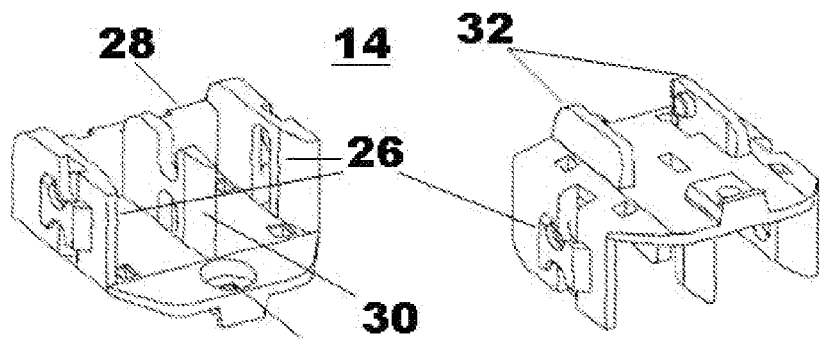
Fig. 3a  Fig. 3b

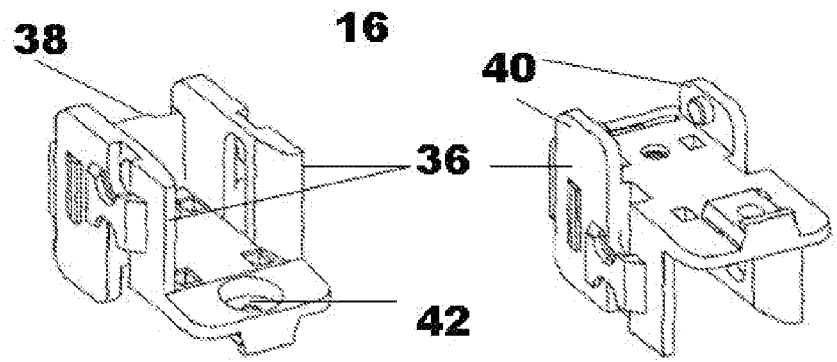
Fig. 4a  Fig. 4b
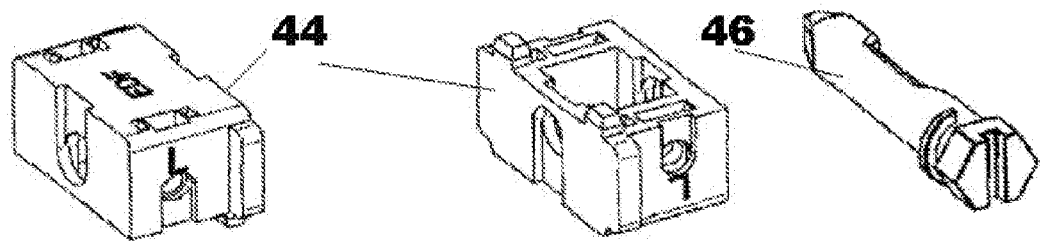
Fig. 5 a  Fig. 5 b  Fig. 6
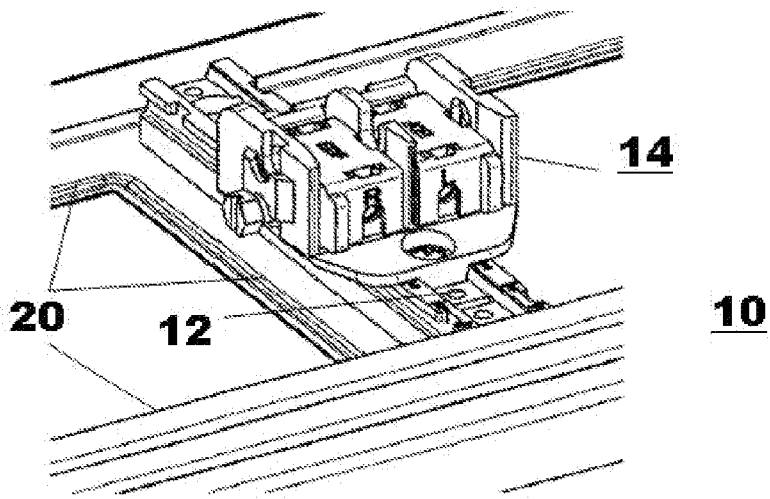
Fig. 7

ELECTRICAL SWITCHGEAR AND DISTRIBUTION CABINET

RELATED APPLICATION

This application claims priority under 35 U.S.C. §119 to European Patent Application No. 10014456.7 filed in Europe on Nov. 10, 2010, the entire content of which is hereby incorporated by reference in its entirety.

FIELD

The invention relates to an electrical switchgear, such as an electrical switchgear and/or distribution cabinet having meter and distribution panels, in which supporting profiles are provided for attachment of electrical and/or electronic components.

BACKGROUND INFORMATION

DE 8432766 U1 discloses a kit for mounting apparatuses for electrical switchgear or distribution cabinets, that includes numerous individual parts which, together with one another, allows widely different internal subdivision and a widely differing internal configuration of the relevant electrical switchgear or distribution cabinet.

One disadvantage of known systems is the large number of individual parts as well as the different shapes, which prevent certain parts from being combined with others.

For example, until now, C profiles, for example parts with the dimensions 40×20 mm, have been used for distribution panels with the physical height 1800 mm and 2100 mm, for example, in order to provide adequate robustness for this physical height. In contrast, U profiles, for example parts with the dimensions 16×20 mm, can be used for meter and distribution panels with physical heights of 450 mm to 1350 mm, for example.

Because of these different profile shapes and profile dimensions, a large number of different holding elements should be provided for the corresponding meter and distribution housings, and thus together match the respective profiles.

These different profiles can result in different cabinet types, which are each intended for only one specific profile type, such as a C profile or a U profile, and accordingly match only this profile.

SUMMARY

An electrical switchgear or distribution cabinet is disclosed having meter and distribution panels in which supporting profiles are provided for attachment of at least one of electrical and electronic components to the supporting profiles, which are in the form of a C profile or a U profile, the electrical switchgear or distribution cabinet comprising: a sliding rail connected to at least one holding apparatus for holding a supporting profile, wherein the supporting profiles have different shapes, profiles and dimensions, wherein the sliding rail is connected in a fixed position, at predetermined positions to a relevant wall of the switchgear or distribution cabinet, and wherein the at least one holding apparatus can be fixed in position on the sliding rail.

An exemplary electrical switchgear is disclosed comprising: meter and distribution panels having supporting profiles for attaching at least one of electrical and electronic components; at least one holding apparatus for holding a supporting profile; and a sliding rail connected to the at least one holding apparatus and in a fixed position to a cabinet wall, wherein the respective holding apparatus is in a fixed position on the sliding rail.

An exemplary distribution panel is disclosed comprising: meter and distribution panels having supporting profiles for attaching at least one of electrical and electronic components; and at least one holding apparatus for holding a supporting profile; a sliding rail connected to the at least one holding apparatus and in a fixed position to a cabinet wall, wherein the respective holding apparatus is in a fixed position on the sliding rail.

DESCRIPTION OF THE DRAWINGS

The invention, advantageous refinements and improvements of the invention, as well as particular advantages of the invention, will be explained and described in more detail with reference to one exemplary embodiment of the invention, which is illustrated in the attached drawings, in which:

FIG. 1 shows a perspective detail view of the interior of an electrical switchgear and/or distribution cabinet in accordance with an exemplary embodiment of the present disclosure;

FIG. 2 shows a sliding rail in accordance with an exemplary embodiment of the present disclosure;

FIG. 3a shows a perspective view from above of a holding apparatus for a C profile in accordance with an exemplary embodiment of the present disclosure;

FIG. 3b shows a perspective view from below of a holding apparatus for a C profile in accordance with an exemplary embodiment of the present disclosure;

FIG. 4a shows a perspective view from above of a holding apparatus for a U profile or C profile in accordance with an exemplary embodiment of the present disclosure;

FIG. 4b shows a perspective view from below of a holding apparatus for a U profile or C profile in accordance with an exemplary embodiment of the present disclosure;

FIG. 5a shows a perspective view from above of a U profile as a panel holding element in accordance with an exemplary embodiment of the present disclosure;

FIG. 5b shows a perspective view from below of a U profile as a panel holding element in accordance with an exemplary embodiment of the present disclosure;

FIG. 6 shows an oblique view from above of a fixing pin in accordance with an exemplary embodiment of the present disclosure;

FIG. 7 shows a sliding rail fitted in an electrical switchgear and/or distribution cabinet, with a holding apparatus for a U profile in accordance with an exemplary embodiment of the present disclosure;

DETAILED DESCRIPTION

Figure 8:
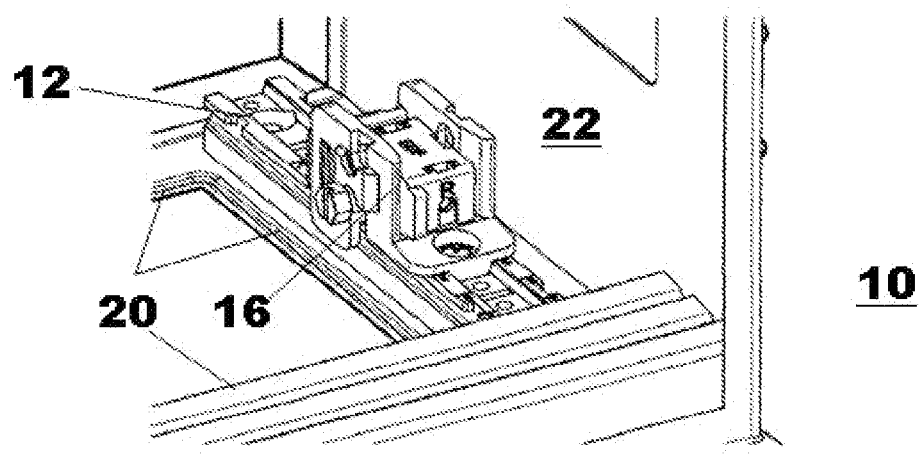
FIG. 8 shows a sliding rail fitted in an electrical switchgear and/or distribution cabinet with a holding apparatus for a U profile on the right and on the left in the cabinet in accordance with an exemplary embodiment of the present disclosure.

Exemplary embodiments of the present invention provide an electrical switchgear and distribution cabinet of the type mentioned initially, in which the internal configuration is ensured, in terms of the respectively specified subdivisions and electrical components to be arranged therein, with as little complexity as possible.

Exemplary embodiments of the present disclosure avoid the large number of different profile holding apparatuses and, instead of find uniformity for the holding, which allows different profile types, for example a C profile and a U profile, to be installed in one holding element, without any need for additional conversion or a new cabinet type.

A further aspect of the exemplary embodiment is to ensure a simple adjustment capability for the holding element in the cabinet depth, thus allowing the holding elements to be used for different cabinet depths. A final aim is to also allow U profiles to be alternatively installed with the same holding parts in cabinets with the physical height 1800 mm, which are possibly held at the midpoint of the cabinet height, depending on the panel height i.

In an exemplary embodiment of the present disclosure, a sliding rail is provided, connected to at least one holding apparatus for holding a supporting profile, with the supporting profiles having different shapes, profiles and dimensions. Furthermore, the sliding rail is connected in a fixed position, at predetermined positions, to the relevant wall of the switchgear and/or distribution cabinet, and finally the respective holding apparatus can be fixed in position on the sliding rail.

According to another exemplary embodiment of the present disclosure, the sliding rail is matched to the respective physical depth of the relevant switchgear and/or distribution cabinet, and is provided with an adjusting grid, which allows the holding apparatus which is provided to be positioned in an interlocking manner.

This exemplary configuration can be advantageous with respect to the different physical depths of the individual electrical switchgear and distribution cabinets considered, since a sliding profile according to the present disclosure is effectively available with any desired length, and can accordingly be matched to any specified length.

Exemplary embodiments of the present disclosure provides that threaded bolts are welded to the cabinet wall for attachment of the sliding rail, to which threaded bolts the sliding rail is fixed, with the relevant cabinet wall.

According to another exemplary embodiment of the present disclosure, each supporting profile which is provided for holding an electrical and/or electronic component can be fitted at any installation location of the holding apparatus, through cutting to a specified length and be connected to the holding apparatus which is arranged at the intended installation location.

In an exemplary embodiment, the holding apparatus can be used for anchoring a supporting profile to the sliding rail and can be a moulding manufactured from a metallic casting, such as a zinc casting or aluminium casting, for example.

Alternatively, the holding apparatus, which is provided for anchoring a profile to the sliding rail can be a stamped and bent part shaped from sheet metal, and, in special cases, may also be a plastic moulding.

The connection form of the holding apparatus can be matched both to the sliding rail and to the various supporting profiles, such that, in contrast to existing electrical switchgear and/or distribution cabinets, different profiles can be installed within the same cabinet for the relevant electrical appliances, without any need for major conversions or changes.

In another exemplary embodiment of the present disclosure, a panel holding element, is used for installation of switch panels and is connected in an interlocking manner to the holding apparatus. This panel holding element can be formed from a tough plastic, for example PS (polystyrene) or PA (polyamide), or alternatively also an aluminium casting, with its shape being matched to that of the holding apparatus, in such a way that it is also possible to use one panel holding element without any problems wherever an exemplary holding apparatus is used.

In an exemplary embodiment development of the present disclosure, a fixing pin can be provided for attachment of the panel holding element to the holding apparatus. The fixing pin engages in recesses provided for this purpose in the panel holding element and in the holding apparatus, and connects them to one another, i.e. the holding apparatus to the sliding rail, in a force-fitting and interlocking manner.

Furthermore, a fixing screw in each case can be provided for fixing the holding apparatus to the sliding rail, engages in threaded holes provided for this purpose in the sliding rail, and connects the two to one another.

FIG. 1 shows a perspective detail view of the interior of an electrical switchgear and/or distribution cabinet in accordance with an exemplary embodiment of the present disclosure. As shown in FIG. 1, the interior of an electrical switchgear and/or distribution cabinet 10 includes sliding rails 12, holding apparatuses 14, 16 and supporting profiles 18 arranged therein, and with panel holding elements 44 fitted therein for holding the supporting profiles 18 in a U-shape.

This detail illustration is intended to provide an overview of the scope of the present invention and to illustrate how the individual attachment and fitting parts interact.

The cabinet 10 which is formed by side walls 22 with reinforcing struts 20 fitted thereto, with the reinforcing struts 20 and the side walls at the same time also being used for attachment of the fitting aids, such as sliding rails 12 and, possibly, the supporting profiles 16. The holding apparatuses 14 are used as aids between the sliding rails 12, to which they are connected in an interlocking and force-fitting manner, and the supporting profiles 18, which hold them and dissipate their forces into the wall structure of the relevant cabinet 10.

FIG. 2 shows a sliding rail in accordance with an exemplary embodiment of the present disclosure. As shown in FIG. 2, a pattern of recesses 24 can be located one behind the other, and be in the form of threaded holes and interact with holding screws 26, by means of which the holding apparatuses 14, 16 are fixed on the sliding rail 12.

The distance between the round recesses 24 corresponds to a grid predetermined by the design, which includes a specific fixed dimension, for example 12.5 cm.

FIG. 3a shows a perspective view from above of a holding apparatus for a C profile in accordance with an exemplary embodiment of the present disclosure. FIG. 3b shows a perspective view from below of a holding apparatus for a C profile in accordance with an exemplary embodiment of the present disclosure. As shown in FIGS. 3a and 3b, the upper face of the holding apparatus 14 has two side webs 28, which are connected to one another by a base web 30, which can keep the side webs 28 are separated from one another. A center web 32 is also provided between the side webs, and is used for further stiffening. In this way, the side webs 28, the base web 30 and the center web 32 bound a cavity, which will also be described in the following text.

The side webs 28 and the base web 30 are used to provide a C profile which is intended to be fitted in this case, in that the flanks of the C profile clasp the side webs 28 and the base web 30 of the first holding apparatus 14 with a tight fit, and can be additionally connected to the holding apparatus 14 by additional pins or screws.

The holding apparatus itself has two guide webs 32, which are integrally formed on its lower face, for engaging in the sliding rail 12, and is attached to the sliding rail 12 by means of a holding screw which is not shown here but passes through a recess 34 provided for this purpose.

FIG. 4a shows a perspective view from above of a holding apparatus for a U profile or C profile in accordance with an exemplary embodiment of the present disclosure. FIG. 4b shows a perspective view from below of a holding apparatus for a U profile or C profile in accordance with an exemplary embodiment of the present disclosure. As shown in FIGS. 4a and 4b, the part is mounted on the left and right on the sliding rail 12 in the cabinet. Its position in the cabinet is therefore at the bottom on the left, at the bottom on the right, at the top on the left and at the top on the right. The part is likewise used for attachment of the central supporting rail.

In principle, the configuration of the second embodiment of a holding apparatus 16 is similar to the first embodiment of the holding apparatus 14, but the distance between the side webs 36 is only approximately half as great as in the case of the first holding apparatus 14, as a result of which there is no center web and the holding apparatus 16 can hold only one U-shaped or C-shaped frame profile.

In this exemplary embodiment as well, a base web 38 is provided, which together with the side webs 36 bounds a cavity, as well as guide webs 40 which can be integrally formed on the lower face as an extension of the side webs 36. Furthermore, a recess 42 is provided for a holding screw for attachment of the holding apparatus 16 to the relevant sliding rail 12.

FIG. 5a shows a perspective view from above of a U profile as a panel holding element in accordance with an exemplary embodiment of the present disclosure. FIG. 5b shows a perspective view from below of a U profile as a panel holding element in accordance with an exemplary embodiment of the present disclosure. The panel holding element 44 can be used for installing a switch panel within an electrical switchgear and/or distribution cabinet 10, and can be inserted into the cavities, which are bounded by the side webs 28, 36 and the center web 32, on the upper face of the holding apparatuses 14, 16, and is fixed by means of a fixing pin 46.

FIG. 6 shows an oblique view from above of a fixing pin in accordance with an exemplary embodiment of the present disclosure. As shown in FIG. 6 the fixing pin passes laterally through the relevant holding apparatus 14, 16 and the panel holding element 44 located therein. The insertion of the panel holder 44 into the holding apparatus 14 and 16 ensures that the U profile 18 can be installed in the cabinet.

FIG. 7 shows a sliding rail fitted in an electrical switchgear and/or distribution cabinet with a holding apparatus for a U profile in accordance with an exemplary embodiment of the present disclosure. FIG. 8 shows a sliding rail fitted in an electrical switchgear and/or distribution cabinet with a holding apparatus for a U profile fitted on the right and on the left in the cabinet in accordance with an exemplary embodiment of the present disclosure.

As shown in FIGS. 7 and 8, an electrical switchgear and/or distribution cabinet 10 includes the sliding rail 12 in conjunction with a first holding apparatus 14 and a second holding apparatus 16 for the fitting of U-shaped supporting profiles 18, being shown in the assembled state.

In both exemplary embodiments, panel holding elements 44 are inserted into the holding apparatuses 14, 16 and are secured in a fixed position by means of a fixing pin 46. This allows the installation of the U profiles 18. In contrast, if the panel holding element 44 were to be removed in this configuration, then the C profile 16 could be fitted, and is likewise attached by means of the fixing pin 46.

In addition, the fixing pin 46 is provided with a self-tapping threaded head as a result of which, in principle, no threaded hole is specified for its attachment, for the interlocking anchorage which is provided by the self-tapping threaded head is effectively provided by the item itself, when the fixing pin 46 is screwed in.

Furthermore, the fixing pin 46 is also used for connection and attachment of the C profiles in the holding apparatuses 14 and 16.

Figure 9:
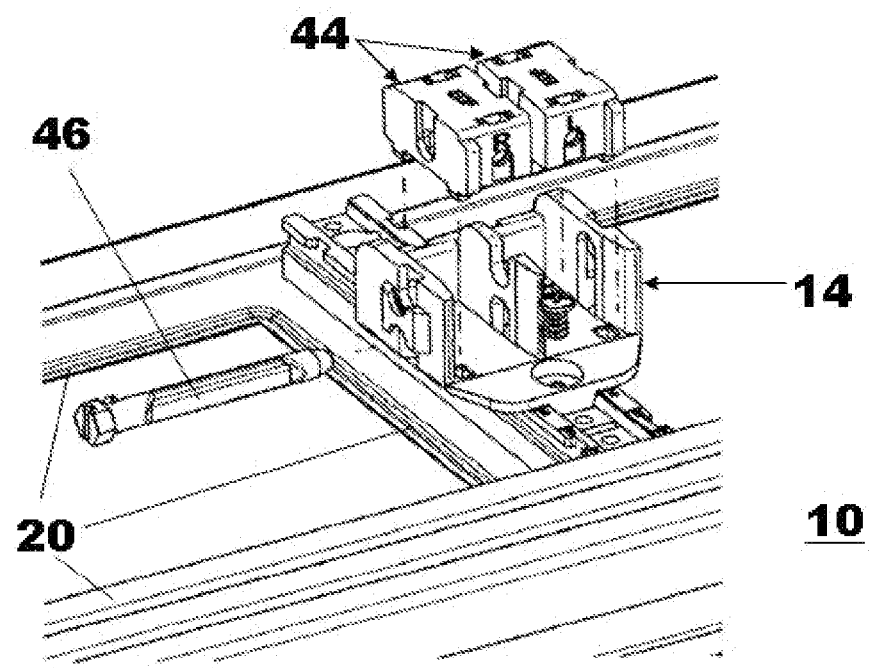
FIG. 9 shows a sliding rail fitted in an electrical switchgear and/or distribution cabinet with a holding apparatus for a C profile and panel holding elements for U profiles in accordance with an exemplary embodiment of the present disclosure.

FIG. 9 shows a sliding rail fitted in an electrical switchgear and/or distribution cabinet with a holding apparatus for a C profile and panel holding elements for U profiles in accordance with an exemplary embodiment of the present disclosure. FIG. 9 shows an arrangement of a sliding rail 12, which is fitted in an electrical switchgear and/or distribution cabinet 10, with a holding apparatus 14 for a U profile 18 fitted thereto, and panel holding elements 44 which can be fitted therein, with this illustration showing that the panel holding elements 44 are each inserted from above into the relevant cavities in the holding apparatus 14.

In the exemplary embodiment shown in FIG. 4, one advantageous embodiment of the invention also takes account of the fact that the size of the already mentioned items, side webs 28, 36 and the base webs 30, 38 as well as the centre web 40, are in each case the same for a C profile in the case of the first holding apparatuses 14 and 16, as a result of which the panel holding elements 44 which are likewise used are of a standard size and engage with an accurate fit both in the cavities in the first holding apparatus 14 and in the cavities in the second holding apparatus 16.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

List of reference symbols

| | |
|---|---|
| 10 | Electrical switchgear and/or distribution cabinet |
| 12 | Sliding rail |
| 14 | First holding apparatus |
| 16 | Second holding apparatus for the top and bottom on the right and for the top and bottom on the left |
| 18 | Supporting profiles |
| 20 | Reinforcing struts |
| 22 | Side wall |
| 24 | Recess |
| 26 | Side web |
| 28 | Base web |
| 30 | Centre web |
| 32 | Guide web |
| 34 | Recess |
| 36 | Side web |
| 38 | Base web |
| 40 | Guide web |
| 42 | Recess |
| 44 | Panel holding element for U profile |
| 46 | Fixing pin for the attachment of the C profile and for the attachment of the panel holding elements 44 |

What is claimed is:

1. An electrical switchgear or distribution cabinet having meter and distribution panels in which supporting profiles are provided for attachment of at least one of electrical and electronic components to the supporting profiles, which are in the form of a C profile or a U profile, the electrical switchgear or distribution cabinet comprising:

a sliding rail connected to at least one holding apparatus for holding a supporting profile, wherein the supporting profiles have different shapes, profiles and dimensions, wherein the sliding rail is connected in a fixed position, at predetermined positions to a relevant wall of the switchgear or distribution cabinet, wherein the at least one holding apparatus can be fixed in position on the sliding rail, and wherein the at least one holding apparatus is used as an aid between the sliding rails to which they are connected in an interlocking and force-fitting manner, and the supporting profiles, which hold them and dissipate their forces into the wall structure of the relevant cabinet, and the sliding rail is matched to a physical depth of the switchgear, and includes an adjusting grid for allowing the holding apparatus to be positioned in an interlocking manner.

2. The electrical switchgear or distribution cabinet according to claim 1, further comprising:
threaded bolts that are welded to a cabinet wall for attachment of the sliding rail.

3. The electrical switchgear or distribution cabinet according to claim 1, wherein each supporting profile, which is provided for holding at least one of the electrical and electronic components, is fitted at any installation location of the holding apparatus, and is cut to a specified length.

4. The electrical switchgear or distribution cabinet according to claim 1, wherein the holding apparatus, which is provided for anchoring a supporting profile to the sliding rail, is a molding manufactured from a metallic casting, zinc casting or aluminium casting.

5. The electrical switchgear or distribution cabinet according to claim 1, wherein the holding apparatus, which is provided for anchoring a supporting profile to the sliding rail, is a stamped and bent part shaped from sheet metal.

6. The electrical switchgear or distribution cabinet according to claim 1, wherein the holding apparatus, which is provided for anchoring a supporting profile to the sliding rail, is a plastic molding.

7. The electrical switchgear or distribution cabinet according to claim 1, wherein the connection form of the holding apparatus is matched both to the sliding rail and to the supporting profiles of the at least one holding apparatus.

8. The electrical switchgear or distribution cabinet according to claim 1, further comprising:
a panel holding element, for installation of switch panels and is connected in an interlocking manner to the holding apparatus.

9. The electrical switchgear or distribution cabinet according to claim 8, further comprising:
a fixing pin for attachment of the panel holding element to the holding apparatus, wherein the fixing pin engages a panel holding element in the holding apparatus and connects the holding apparatus and the panel holding element in a force-fitting and interlocking manner.

10. The electrical switchgear or distribution cabinet according to claim 1, further comprising:
a fixing screw for fixing the holding apparatus to the sliding rail, wherein the fixing screw engages holes in the sliding rail for connecting the holding apparatus and the sliding rail.

11. An electrical switchgear comprising:
meter and distribution panels having supporting profiles for attaching at least one of electrical and electronic components;
at least one holding apparatus for holding a supporting profile; and
a sliding rail connected to the at least one holding apparatus and in a fixed position to a cabinet wall,
wherein the respective holding apparatus is in a fixed position on the sliding rail, and
wherein the at least one holding apparatus is used as an aid between the sliding rails to which they are connected in an interlocking and force-fitting manner, and the supporting profiles, which hold them and dissipate their forces into the wall structure of the relevant cabinet, and the sliding rail is matched to a physical depth of the switchgear, and includes an adjusting grid for allowing the holding apparatus to be positioned in an interlocking manner.

12. The electrical switchgear according to claim 11, wherein each supporting profile is one of a C profile or a U profile.

13. The electrical switchgear according to claim 11, wherein each supporting profile has a different shape, profile, and dimension than other supporting profiles.

14. The electrical switchgear according to claim 11, further comprising:
threaded bolts affixed to the cabinet wall for attachment of the sliding rail.

15. The electrical switchgear according to claim 14, wherein the sliding rail is affixed to the cabinet wall via the threaded bolts.

16. The electrical switchgear according to claim 11, wherein each supporting profile is fitted at an installation location of the holding apparatus, and is cut to a specified length.

17. The electrical switchgear according to claim 11, wherein the holding apparatus is a molding that includes metallic casting, zinc casting or aluminium casting.

18. A distribution panel comprising:
meter and distribution panels having supporting profiles for attaching at least one of electrical and electronic components;
at least one holding apparatus for holding a supporting profile; and
a sliding rail connected to the at least one holding apparatus and in a fixed position to a cabinet wall,
wherein the respective holding apparatus is in a fixed position on the sliding rail, and
wherein the at least one holding apparatus is used as an aid between the sliding rails to which they are connected in an interlocking and force-fitting manner, and the supporting profiles, which hold them and dissipate their forces into the wall structure of the relevant cabinet, and the sliding rail is matched to a physical depth of the switchgear, and includes an adjusting grid for allowing the holding apparatus to be positioned in an interlocking manner.

* * * * *